United States Patent [19]

Sergeant et al.

[11] 4,303,724
[45] Dec. 1, 1981

[54] ADHESIVE TAPES CONTAINING TEXTURIZED YARNS

[75] Inventors: Timothy L. Sergeant, Seneca, S.C.; Luz E. Thomas, Brockton, Mass.

[73] Assignee: The Kendall Co., Boston, Mass.

[21] Appl. No.: 183,887

[22] Filed: Sep. 4, 1980

[51] Int. Cl.³ .......................... D03D 3/00; B32B 5/02
[52] U.S. Cl. .................................... 428/229; 428/247; 428/257; 428/258; 428/259; 428/284; 428/343; 428/354
[58] Field of Search ............... 428/246, 252, 257, 258, 428/259, 284, 286, 343, 354, 365, 369, 371, 229, 247

[56] References Cited

U.S. PATENT DOCUMENTS

| | | | |
|---|---|---|---|
| 2,750,314 | 6/1956 | Bemmels | 428/354 |
| 2,750,315 | 6/1956 | Turney | 428/354 |
| 2,783,609 | 3/1957 | Breen | 28/252 |
| 2,869,967 | 1/1959 | Breen | 28/252 |
| 2,895,865 | 7/1959 | Humphner | 428/343 |
| 2,942,327 | 6/1960 | Corry | 428/258 |
| 3,252,833 | 5/1966 | Skobel | 428/343 |
| 3,853,598 | 12/1974 | Raguse | 428/354 |
| 4,196,763 | 4/1980 | Imamura | 428/258 |

*Primary Examiner*—James J. Bell

[57] ABSTRACT

The tear properties of flexible adhesive tapes comprising a pliable base and a low-count open meshed fabric adhered thereto by a layer of adhesive are improved by the use of so-called texturized or false-twist yarns in the filling of the fabric.

8 Claims, 8 Drawing Figures

ADHESIVE TAPES CONTAINING TEXTURIZED YARNS

This invention relates to improvements in the tear characteristics of certain adhesive tapes, particularly industrial tapes of the type known as duct tapes. Such tapes commonly comprise a pliable film base, such as polyethylene; a reinforcing open-meshed fabric; and an adhesive mass which anchors the fabric to the film, coating the fabric surface.

BACKGROUND OF THE INVENTION

It is customary for tapes of this nature to have a reinforcing fabric of spun cotton, rayon, or synthetic yarns, which provide strength to the tape in processing and in use. Such a fabric, when woven, normally varies in count from 32 to 44 warp yarns and 20 to 36 filling yarns per square inch, with the yarns 30's singles, of spun cotton.

Such fabrics have more than adequate strength for the reinforcement of such tapes, and for the sake of economy attempts have been made to utilize gauze fabrics of lower count, such as 24×20 or 20×12. However, in applications involving the use of the tape, it is customary to tear the tape across the warp yarns by hand, particularly when a number of repeated applications are made as in sealing the joints in industrial ductwork. When tapes containing a low-count gauze, are thus used, they almost invariably tear in a ragged and frayed manner, with dangling threads and the likelihood of deformation of the film backing.

Attempts have been made to improve the tear characteristics of tapes comprising low-count fabrics by using stronger yarns in the filling, such as high-twist spun yarns, continuous filament synthetic yarns, or even monofilament yarns, all with a marked lack of success.

It is with improvements in the tear properties of such tapes that the present invention is concerned, and it is an object of the invention to provide an adhesive tape incorporating a low-count fabric which when torn crosswise by hand will tear in a smooth and even manner.

SUMMARY OF THE INVENTION

It has now been found that so-called texturized or "false-twist" yarns in the filling of low-count fabrics, such as 24×20 or 20×12, will have a dramatic and unexpected effect on the tear characteristics of adhesive tapes incorporating such fabrics.

Texturized, or false-twist yarns, are continuous filament yarns which have been given increased bulk and loft by the introduction, of numerous loops, curls, and coils along the length of the individual filaments by aerodynamic or twist-set-untwist processes. Such yarns, commonly using nylon or polyester filaments, are a standard article of commerce. Due to the numerous irregularities induced along the individual filament lengths, such yarns are inherently elastic to some degree. Representative products and processes describing such yarns are set forth in U.S. Pat. Nos. 2783609 and 2869967, among others.

BRIEF DESCRIPTION OF THE DRAWINGS

The invention may be more fully understood with reference to the following description and drawings, in which.

DESCRIPTION OF THE INVENTION

Figure 5:
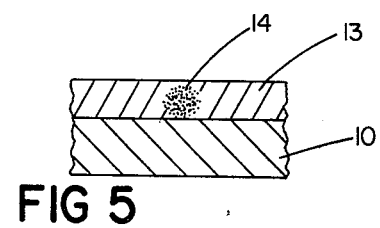
FIG. 5 is a highly magnified cross-sectional view of a segment of a three-component adhesive tape in which a spun yarn or a non-texturized continuous filament yarn is employed in the filling of the fabric.
Figure 6:
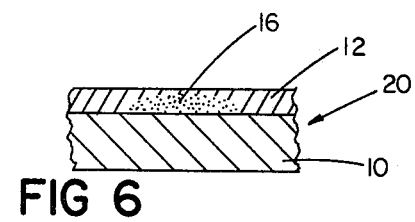
FIG. 6 is a similar view of an adhesive tape in which texturized yarns are employed in the filling of the fabric.

Referring now to FIG. 6, the adhesive tapes 20 of this invention comprise a pliable backing substrate 10, commonly a layer of polyolefine film; a layer of adhesive 12; and a reinforcing fabric such as a low-count woven gauze or a yarn-reinforced nonwoven fabric. In FIG. 5, 14 represents the cross-section of a filling yarn in a prior art fabric in which a non-texturized continuous filament yarn is employed in the filling of the fabric. In FIG. 6, 16 represents a similar cross section of a filling yarn in fabric of this invention in which a texturized yarn is employed in the filling.

Figure 1:
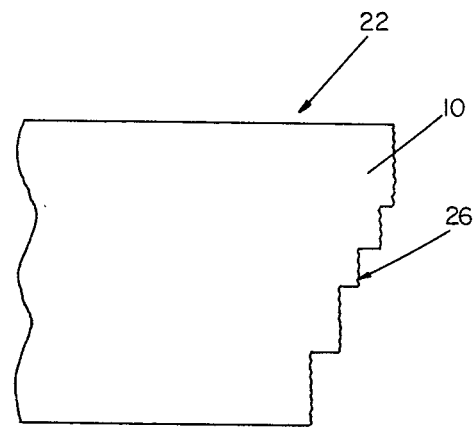
FIGS. 1 and 2 are representations of the characteristically irregular torn ends of adhesive tapes using low-count fabrics of 24×20 or 20×12 count wherein the filling yarns in the fabric are spun yarns or non-texturized continuous filament yarns.
Figure 2:
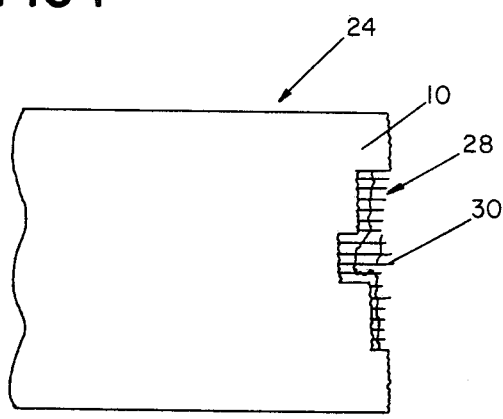

FIGS. 1 and 2 are elevation views of prior art three-component adhesive tapes, with hand-torn edges 26 and 28 respectively, wherein a low-count woven 20×12 fabric with spun yarns or non-texturized continous filament filling yarns employed in the filling of the fabric. Depending on the specific nature of the adhesive, which affects the degree of union between fabric and base, the tear may be of the so-called "step ladder" variety as at 26 in FIG. 1, or of the variety shown at 28 in FIG. 2, where the yarns 30 of the fabric have pulled away from the base 10. Either type of tear is undesirable, interfering with a smooth, even, rapid application of such tapes.

Figure 3:
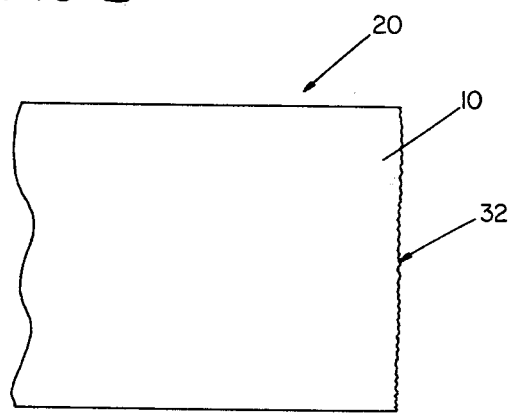
FIG. 3 is a similar representation of the torn end of an adhesive tape wherein the fabric component is a 20×12 woven gauze with texturized yarns in the filling of the fabric.
Figure 4:
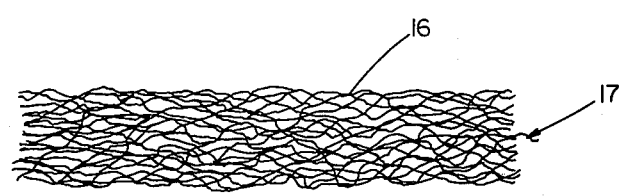
FIG. 4 is a highly magnified cross-sectional view of a section of a texturized yarn 16 as used in the fabric employed in the adhesive tapes of the invention, consisting of convoluted filaments 17.

By contrast, FIG. 3 is a view of the hand torn edge 32 of a tape 20 of this invention, employing texturized yarns in the filling of a woven 20×12 fabric.

A possible explanation of the efficiency of texturized yarns in effecting this result may lie in the randomly kinked, coiled, and curled nature of the filaments of such yarns. Microscopic studies of tapes made using non-texturized continuous filament or spun yarns versus texturized yarns in the filling of such fabrics reveals that the latter afford approximately twice the filling yarn coverage, which is a measure of the degree of adhesion between individual filaments, adhesive mass, and the pliable base. As an example, considering FIGS. 5 and 6 again, a tape made using non-texturized continuous filament yarns in the filling of a 20×12 fabric revealed that the width of the 220 denier continuous filament yarn averaged 0.33 mm., as shown at 14 in FIG. 5. An otherwise identical tape, using 200 denier texturized polyester yarn in the filling or lateral direction (FIG. 6) revealed that the width of the filling yarns averaged 0.65 mm., as shown at 16 in this figure, thus doubling the area of mass-to-yarn contact.

An additional advantage of the use of texturized yarns in accordance with this invention lies in the fact that since such yarns flatten out and spread more than non-texturized yarns, less adhesive mass is needed to unite the base, the fabric, and the mass into an integral tape, as shown by comparison of the relative thicknesses of adhesive mass 13 in prior art tapes, FIG. 5, and the adhesive mass 12 of the tapes of this invention, FIG. 6. Since the function of the adhesive mass is to present a smooth even surface to the article to which it is to be applied, sufficient mass is used to cover the reinforcing fabric and anchor it securely to the backing. In this respect, the spreading characteristic of the texturized yarn 16 allows as thinner film of adhesive mass to be used, resulting in a thinner, more pliable tape as well as economics in adhesive mass reduction.

The following example is illustrative only and does not limit the scope of the invention.

SPECIFIC EMBODIMENT OF THE INVENTION

A gauze fabric was constructed using 20 yarns per inch of 30's cotton in the warp, 12 false-twist polyester yarns, 200 denier 96 filament, per inch of filling. In a calendering operation, this gauze was superimposed on a 4 mil thick low density polyethylene film and combined with a 6 mil thick layer of adhesive mass. The adhesive mass was composed of 40% rubber, 30% fillers, 28% tackifier resins, and 2% process aids. Calendering was by means of a 3 roll calendar with the top roll heated to 400 degrees F., center roll 200 degrees F., bottom roll 210 degrees F. Processing speed was 35 yards per minute.

When torn by hand, the tear properties imparted by this 20×12 fabric were comparable to the tear shown in FIG. 3, an even tear hitherto achieved only by the use of fabrics of 44×28 count, 30's cotton yarns, or 32×28 count, with spun yarns of 50% polyester, 50% cotton, or by fabrics of similar higher count.

OTHER EMBODIMENTS OF THE INVENTION

The tape construction of this invention may utilize a wide variety of adhesive masses; hot melts, acrylics, natural and synthetic rubbers, etc. Although the mass is customarily of pressure sensitive nature, the invention is equally applicable to masses of a heat-or solvent-activated mass.

It is also applicable to the use of various pliable bases, with polyethylene film of 4 to 6 mil thickness being preferred. The film may be preformed or film extrusion, fabric lamination, and adhesive application may be combined in a single operation.

Similarly, in place of woven fabrics as reinforcement, nonwoven fabrics or similar pliable but relatively non-extensible fibrous bases may be employed.

Figure 7:
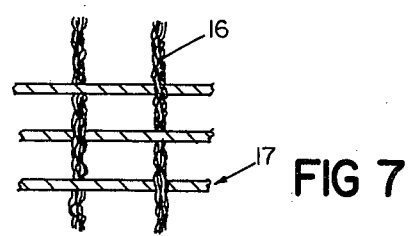
FIG. 7 is a highly magnified view of a segment of a woven fabric suitable for use in this invention.

FIG. 7 is a magnified view of a suitable woven fabric, consisting of regular warp yarns 17 of spun cotton and filling yarns 16 of a texturized type, as characterized above.

Figure 8:
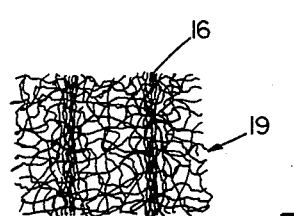
FIG. 8 is a similarly magnified view of a nonwoven fabric suitable for use in this invention.

FIG. 8 is a magnified view of a suitable nonwoven fabric, consisting of an unwoven array of textile length fibers, having adherent thereto a set of texturized yarns 16 arranged laterally of the fabric, corresponding to the filling in a woven fabric. In such yarn-reinforced fibrous bases, the fibrous array should be of a random or isotropic nature, so that the fiber orientation does not interfere with the clean hand-tear nature of the tape.

What is claimed is:

1. In adhesive tapes which comprise a pliable backing material, a reinforcing fabric, and a layer of adhesive mass adherent to said backing material and said fabric, the improvement in which the reinforcing fabric comprises texturized yarns in the filling direction.

2. The adhesive tape according to claim 1 in which the adhesive mass is of a pressure-sensitive nature.

3. The adhesive tape according to claim 1 in which the reinforcing fabric is a woven fabric.

4. The adhesive tape according to claim 3 in which the woven fabric does not contain more than 20 yarns per inch of fabric.

5. The adhesive tape according to claim 1 in which the reinforcing fabric comprises a bonded isotropically distributed fibrous array with not more than 20 texturized yarns per inch of fabric adherent to said array, said texturized yarns extending in the filling or lateral direction.

6. The adhesive tape according to claim 1 in which the pliable backing material is a polyolefine film.

7. The adhesive tape according to claim 1 in which the adhesive mass is of a heat-activated nature.

8. The adhesive tape according to claim 1 in which the adhesive mass is of a solvent-activated nature.

* * * * *